INVENTOR.
D. B. PELTON

June 20, 1967  D. B. PELTON  3,326,592
SOD PICK-UP
Filed May 14, 1965  2 Sheets-Sheet 2
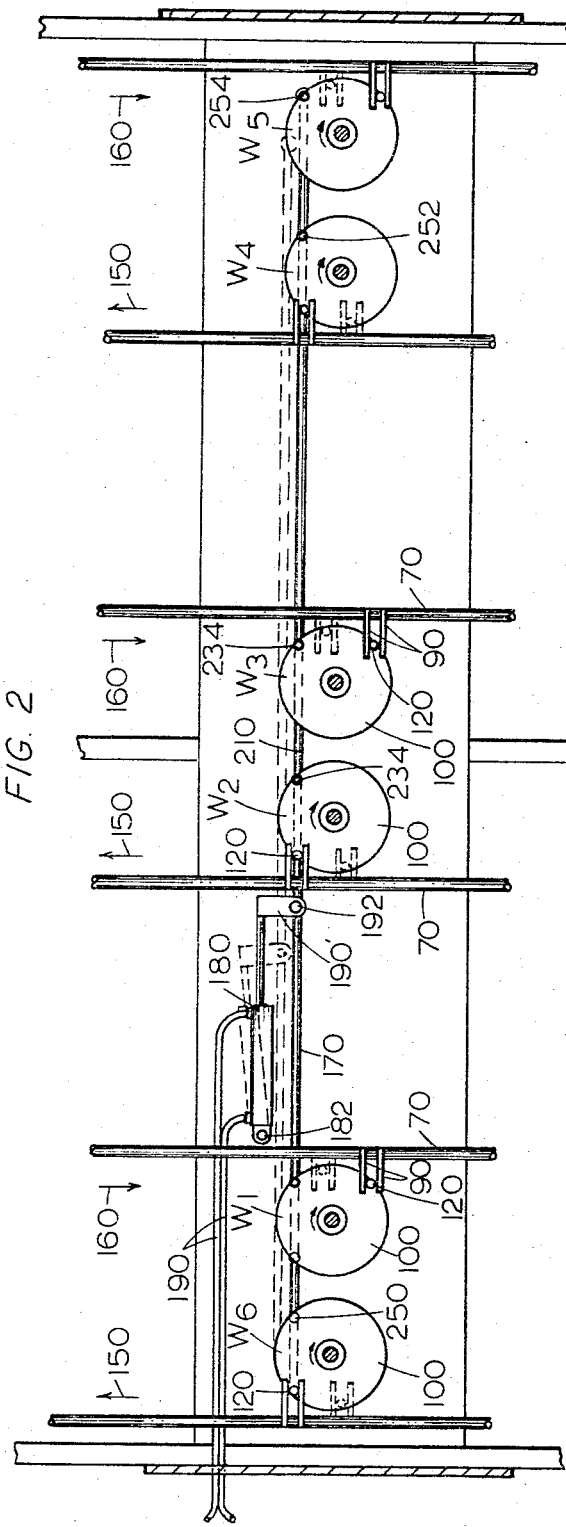
FIG. 2
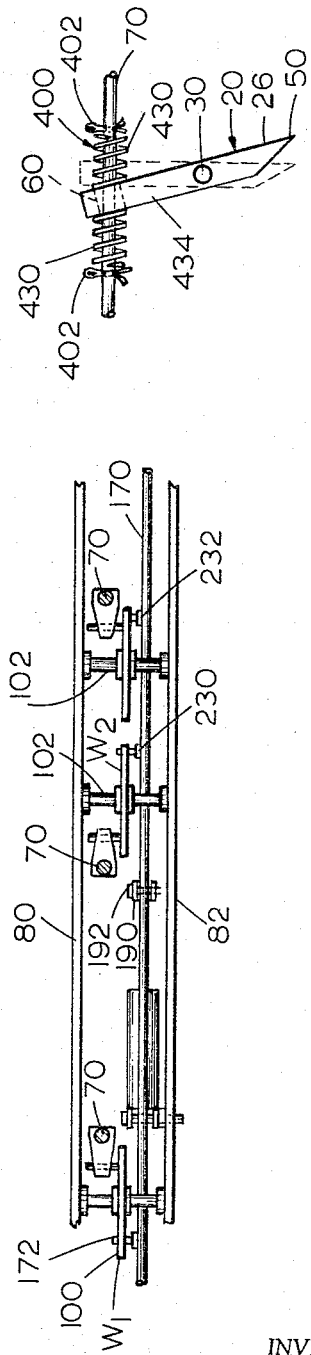
FIG. 4
FIG. 3
INVENTOR.
D. B. PELTON
BY

United States Patent Office 3,326,592
Patented June 20, 1967

3,326,592
SOD PICK-UP
Donald B. Pelton, 1615 S. 60th St.,
Omaha, Nebr. 68106
Filed May 14, 1965, Ser. No. 455,765
2 Claims. (Cl. 294—61)

This invention relates to devices for picking up sod after it has been cut from the earth, and more particularly it is an object of this invention to provide a machine for this purpose which is adapted to pick up a large area of sod at one time, hold it firmly while it is being transferred to a truck, a trailer, or to a new location, and then release it.

Heretofore, sod has conventionally first been cut from the ground in long strips, then rolled up. Machines for handling sod have been sufficiently ineffective that most sod is manually rolled up and lifted onto a carrier.

A disadvantage in the laying of sod that has been rolled is that there are many bumps and joints in the pattern of the sod area when laid in this way.

An object of this invention is to make it possible to lift a large area of sod at once, swing it onto a carrier, and lower it into place in a horizontal position, so that when the time comes to lay the sod, a large area of sod can be removed from the carrier at once and put in place on a prepared ground surface. Because a large area is laid at once, the area involved is substantially free of bumps as there are no joints in the pattern in that area.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 2 is a sectional view taken along the line 2—2 of FIGURE 1.

FIGURE 3 is a top plan view of those portions of the pick-up which are shown in FIGURE 2.

FIGURE 4 is a detail showing a tooth of the invention in side elevation, a dotted line indicating a position to which the tooth can be moved for pick-up or release of sod.

Figure 1:
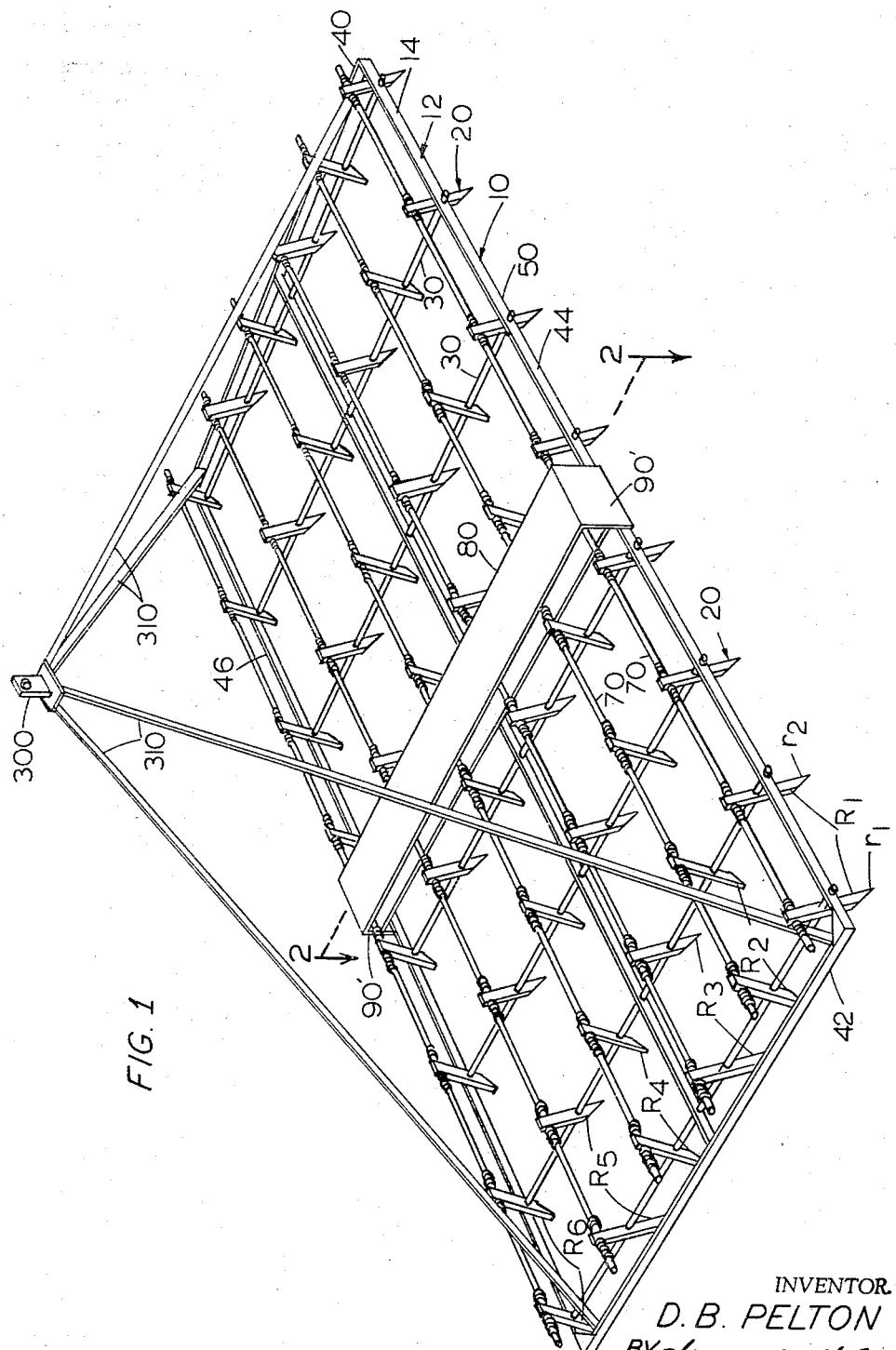
FIGURE 1 is a perspective view of the sod pick-up of this invention shown as seen from an upper side with its teeth in substantially upright position.

Referring now to FIGURE 1, the sod pick-up of this invention is there shown at 10 and comprises a frame 12 which has an outermost portion 14 of generally rectangular shape, as seen in top plan view.

The pick-up has a plurality of spaced teeth 20 protruding downwardly from the frame 12.

The lowermost portions of the underside of the frame 12 will be understood to lie substantially in a horizontal plane with the teeth 20 having lower portions 26 extending downwardly beneath the frame 12, each tooth 20 being pivotally mounted on a horizontal pivot shaft 30 attached to the frame 12.

As best seen in FIGURE 1, the shafts 30 are disposed in parallelism with each other and are spaced apart from one end 40 of the frame 12 to the opposite end 42 thereof. The shafts 30 extend from one side 44 of the frame 12 to the opposite side 46 thereof.

As the shafts 30 are disposed but a short distance from the bottom 50 of the frame 12, the majority of the length of that lower portion 26 of each tooth 20 is disposed beneath the frame 12.

The lower end 50 of each tooth is pointed, as best seen in FIGURE 4.

The teeth 20 are arranged in a plurality of parallel rows $R_1$, $R_2$, $R_3$, $R_4$, $R_5$, and $R_6$, respectively, each row extending in parallelism with each other row lengthwise of the frame 12 with each row spaced apart equidistantly laterally of adjacent rows.

The teeth 20 of each row are spaced apart equidistantly along that row. The spacing of the teeth of one row is equal to the spacing of the teeth of the other rows so that the teeth are arranged, not only in rows extending lengthwise which have been given the numbers $R_1$, $R_2$, etc., but also in rows extending transversely which are identified by the indicia $r_1$, $r_2$, etc.

Each tooth 20 has an upper end opening 60 therethrough which is disposed a substantial distance from its shaft 30, the opening 60 of each tooth extending through the tooth in a direction generally from the end 40 to the end 42 of the pick-up whereby a tooth control rod 70 extends through the openings 60 of all of the teeth 20 which are disposed in a single row $R_1$ or $R_2$, etc.

As thus described, a different rod 70 is provided for each one of the rows $R_1$, $R_2$, $R_3$, etc.

As best seen in FIGURES 1 and 3, across the central part of the frame 12, two vertically spaced horizontal frame members 80 and 82 are mounted on the frame 12 by means of end members 90'.

The horizontal frame members 80 and 82 can be called upper and lower frame members 80 and 82 and the various rods 70 pass therebetween, as best seen in FIGURE 3.

Each rod 70 has on it a pair of laterally extending dogs 90 which are spaced apart longitudinally along the respective rod 70, the dogs 90 being disposed in parallelism and normally to the respective rod 70.

A plurality of wheels or levers 100 are provided, one adjacent each of the rods 70, the wheels 100 being mounted for rotation about vertical axes represented by the centers of shafts 102 which are suitably and rotatably journaled on the lower side of the upper frame member 80 and the upper side of the lower frame member 82, respectively, whereby the wheels 100 are adapted to swing or oscillate in a horizontal plane.

Pins 120 extend upwardly from and are attached to respective wheels 100 and are disposed between the dogs of a respective rod 70, whereby as the respective wheel 100 oscillates, motion of the respective pin 120 will engage the dogs 90 of a respective rod 70 causing the rod to move longitudinally.

The wheels 100 are alternately disposed one on the left of its rod and the next one on the right of its rod, etc., across the machine as has the effect of causing simultaneous movements of adjacent rods 70 in opposite directions as indicated by arrows 150 and 160 and as later described.

A pair of adjacent wheels indicated at $W_1$ and $W_2$ are interconnected by a connecting rod 170 which is pivotally attached at its ends by suitable members 172 to the wheels $W_1$ and $W_2$, the connecting rod extending at a right angle with respect to the rods 70 whereby motion of the rod 170 linearly of itself in either of two opposite directions wall cause correspondingly opposite rotation of the attached wheels $W_1$ and $W_2$.

Linear motion of the rod 170 is controlled by a hydraulic cylinder assembly 180 which has one end pivotally attached to the frame at 182 and has its other end connected by a member 190' and by a pin 192 pivotally to the connecting rod 170 so that expanding and contraction of the cylinder assembly 180 causes linear motion of the rod 170.

Hydraulic lines 190 connected to the hydraulic cylinder 180 lead to means, not shown, for remote control of the hydraulic cylinder 180 from a vehicle such as a tractor which might be carrying the sod pick-up of this invention through a crane means, not shown.

A wheel $W_3$ disposed adjacent the wheel $W_2$ is connected to the wheel $W_2$ by a portion 210 of the connecting rod 170 which has posts 230 and 232 extending upwardly from it and fixed thereto, the posts 230 and 232 being pivotally received in openings 234 in the wheels $W_2$ and $W_3$.

The rod 170 extends on outward to still further wheels $W_4$ and $W_5$ on one side of the machine and $W_6$ on the other side of the machine, the rotation of all of these being controlled by the rod 170 by means of posts 250, 252, and 254 which serve the same purposes as the posts 230 and 232, whereby all the wheels rotate in the same direction at the same time, but because of their being disposed on opposite sides of their respective rods 70, this rotation causes alternate rods 70 to linearly move in opposite directions as indicated by the arrows 150 and 160.

Referring now to FIGURE 1, it will be seen, therefore, that for any one position of a rod 70, its next adjacent rod 70 will be in a position shifted in an opposite direction with respect thereto whereby those teeth 20 which are in row $R_2$ will have their upper ends tilted, for example, toward the end 42 of the frame, while those teeth 20 which are in the row $R_2$ will have their upper ends tilted toward the end 40 of the frame, with the result that the teeth of alternate rows $R_1$, $R_2$, $R_3$, etc., are disposed with their lower ends at any one time either extending vertically or else extending toward opposite ends of the frame.

This, in operation, causes the opposite facing teeth to engage a piece of cut sod through which they extend by pressing it in opposite directions according to the inclination of the respective tooth 20 which tends to grip the sod for holding it in position beneath the sod pick-up until such time as the operator has manipulated the pick-up hydraulic mechanism control, not shown, for causing the hydraulic assembly 180 to indirectly cause all teeth 20 to be in vertical position, at which time, the sod is then free to fall from and to be released by the pickup.

And so, in operation, a grass area is undercut about two inches below the surface of the ground. The grass area is then cut at its edges to define a rectangle that can be picked up because it has been separated from the rest of the ground.

The pick-up is then lowered until its teeth 20, at that time disposed in vertical positions pierce the sod. This lowering is accomplished by means of a crane, not shown, which can be connected to a fitting 300 disposed above the frame 12 and connected to the frame 12 by suitable lift bars 310, or other suitable means.

After the teeth have pierced the sod area, the hydraulic mechanism is shifted for causing teeth of alternate rows to shift for causing them to assume inclinations toward opposite ends of the pick-up, as shown in FIGURE 1, each tooth rotating about its shaft 30 as seen in FIGURE 4.

This will cause the teeth to grip the sod area whereby it can be lifted as the pick-up is lifted.

The sod conveyor can thereby be placed on a suitable carrier and moved to a new location. From there it can be lifted from the carrier by a piercing by the teeth 20 when the pick-up is lowered on the uppermost layer of a group of layers of sod, and the pick-up can then shift the sod layer to a desired ground position and release it.

Because the teeth of alternate rows slant in opposite directions, slantwise slanting of the sod along the teeth is prevented to a sufficient extent to retain the sod on the teeth.

Referring to FIGURE 4, an assembly 400 is there shown for interconnecting each tooth 20 with each respective rod 70 so that the two move together. The interconnection assembly 400 has suitable stop means such as cotter pins 402 extending through the respective rod 70 on opposite sides of the position of a tooth 20, with a pair of springs 430 disposed between the respective stops or cotter pins 402 and the tooth 20 on each side of that upper portion of the tooth 20 which has an opening 60.

The advantage of this structure is that if one tooth should strike a root or other obstruction in the ground, it would not tend to be broken off as its rod 70 moved because the springs 430 would tend to absorb the shock.

The teeth 20 preferably extend below the frame a sufficient distance for penetrating a single layer of grass sod. For example, if it is desired that the sod be of a total depth from top to bottom which is three inches, then the lower part of the teeth should extend three inches beneath the frame.

As thus described, this invention has fulfilled the objectives above set forth in providing a sod pick-up adapted to pick up a large area of sod and to place it on the ground in a manner such that there are no seams in the large area, whereby the pick-up fulfills the objectives above set forth.

From the foregoing description, it is thought to be obvious that a sod pick-up constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. A sod pick-up comprising: a frame, spaced teeth protruding downwardly from said frame, said teeth being dispersed along the underside of said frame so as to engage at dispersed points in sod therebeneath, means movably mounting said teeth on said frame so that elongated lower ends of certain adjacent ones of said teeth can define generally horizontal arcuate movements from first insertion positions of approximate parallelism while pointing downwardly to second gripping positions disposed transversely to one another as seen from one side of said frame also while pointing downwardly, lower ends of said teeth, when in said gripping positions being disposed transversely with respect to the vertical means for causing movement of said teeth from said release to said gripping positions, said teeth being sufficient in number proportional to the area over which they are dispersed as to make possible a retaining of sod thereon when said frame is raised, in which said teeth are each individually pivotally mounted on said frame and each pivoting about a separate pivot point and in which the lower end sections of said teeth are disposed substantially vertical when they are in such penetration positions for entry into sod and removal from sod as said frame is lowered and raised, the lower ends of each of said teeth individually swinging through an arc during movement from penetration position to release position, whereby when said teeth enter and leave sod that is disposed with its upper surface substantially horizontal the movement of said sod with respect to the lower ends of said teeth is substantially along the length of the elongated lower end sections of said teeth, said lower end sections being of sufficient vertical elongation as to penetrate a conventional single layer of grass sod, said teeth being arranged in rows, said rows being at least three in number.

2. A sod pick-up comprising: a frame, spaced teeth protruding downwardly from said frame, said teeth being dispersed along the underside of said frame so as to engage at dispersed points in sod therebeneath, said teeth being sufficient in number proportional to the area over which they are dispersed as to make possible a retaining of a sod section thereon of a substantial area when said frame is raised, said teeth being elongated in substantially a vertical direction during penetration so that each tooth does minimum damage to the sod and so that penetration can be accomplished by a vertical motion of said frame.

References Cited
FOREIGN PATENTS 249,698   2/1964   Australia.
977,119   12/1964   Great Britain.

HUGO O. SCHULZ, *Primary Examiner.*